Nov. 4, 1952  W. H. SILVER ET AL  2,616,346
TRACTOR MOUNTED TWO-WAY PLOW
Filed Oct. 15, 1945  6 Sheets-Sheet 1

FIG. 1

INVENTOR.
WALTER H. SILVER
WILLIAM V. LOHRMAN
BY
ATTORNEYS.

Nov. 4, 1952 W. H. SILVER ET AL 2,616,346
TRACTOR MOUNTED TWO-WAY PLOW
Filed Oct. 15, 1945 6 Sheets—Sheet 2

INVENTOR.
WALTER H. SILVER
WILLIAM V. LOHRMAN
BY
ATTORNEYS.

Nov. 4, 1952     W. H. SILVER ET AL     2,616,346
TRACTOR MOUNTED TWO-WAY PLOW Filed Oct. 15, 1945     6 Sheets—Sheet 6

INVENTOR.
WALTER H. SILVER
WILLIAM V. LOHRMAN
BY

ATTORNEYS.

Patented Nov. 4, 1952

2,616,346

UNITED STATES PATENT OFFICE 2,616,346

TRACTOR MOUNTED TWO-WAY PLOW

Walter H. Silver, Moline, Ill., and William V. Lohrman, Davenport, Iowa, assignors to Deere & Company, Moline, Ill., a corporation of Illinois Application October 15, 1945, Serial No. 622,280

27 Claims. (Cl. 97—26)

1

The present invention relates generally to agricultural implements and more particularly to implements such as two-way plows and the like.

The object and general nature of the present invention is the provision of a two-way plow of integral or tractor mounted type in which the implement unit is supported entirely on the tractor. Further, it is a feature of this invention to provide a two-way plow which is simple and inexpensive and which can be controlled conveniently from the operator's station on the tractor. Additionally, it is a feature of this invention to provide a two-way plow of the quick attachable type, in which the implement as a unit may readily be connected to or disconnected from the tractor by the removal of a single connecting pin.

A further feature of this invention is the provision of a two-way plow of the type in which right and left hand plow bottoms are employed and are swingable about a generally longitudinal axis into and out of operating position, which is especially constructed and arranged to be carried directly by a mobile support, such as a conventional farm tractor or the like. Additionally, it is another feature of this invention to provide improved means for swinging the plowing units from one position to another, which means may readily be operated by a person sitting on the tractor, regardless of whether the right hand plowing unit or the left hand plowing unit is in operating position, and still further, it is a feature of this invention to provide new and improved lever and detent means whereby two levers are employed for swinging the plowing units, so that at least one is always in convenient reach of the operator.

Another feature of this invention is the provision of new and improved draft connections, especially of the quick attachable type, whereby shock loads are cushioned.

Another feature of this invention is the provision of a new and improved agricultural implement in the form of a tractor mounted two-way plow having a single rolling colter which is automatically adjusted so as to be disposed in the proper position in front of whichever one of the right and left hand plowing units that is brought into plowing position, and in this connection it is a further feature of this invention to provide means for automatically positioning the rolling colter by the movement of the means that is used to swing one or the other of the plowing units into operating or plowing position.

These and other objects and advantages of the present invention will be apparent to those skilled in the art after a consideration of the following detailed description of the preferred structure in which the principles of the present invention have been incorporated.

In the accompanying drawings:

Figure 4 is a fragmentary plan view of a two-way plow substantially the same as that shown in Figures 1-3 but embodying a spring cushion connection so as to cushion shock loads and the like;

Figure 5 is a fragmentary side view of the implement shown in Figure 4;

Figure 1:
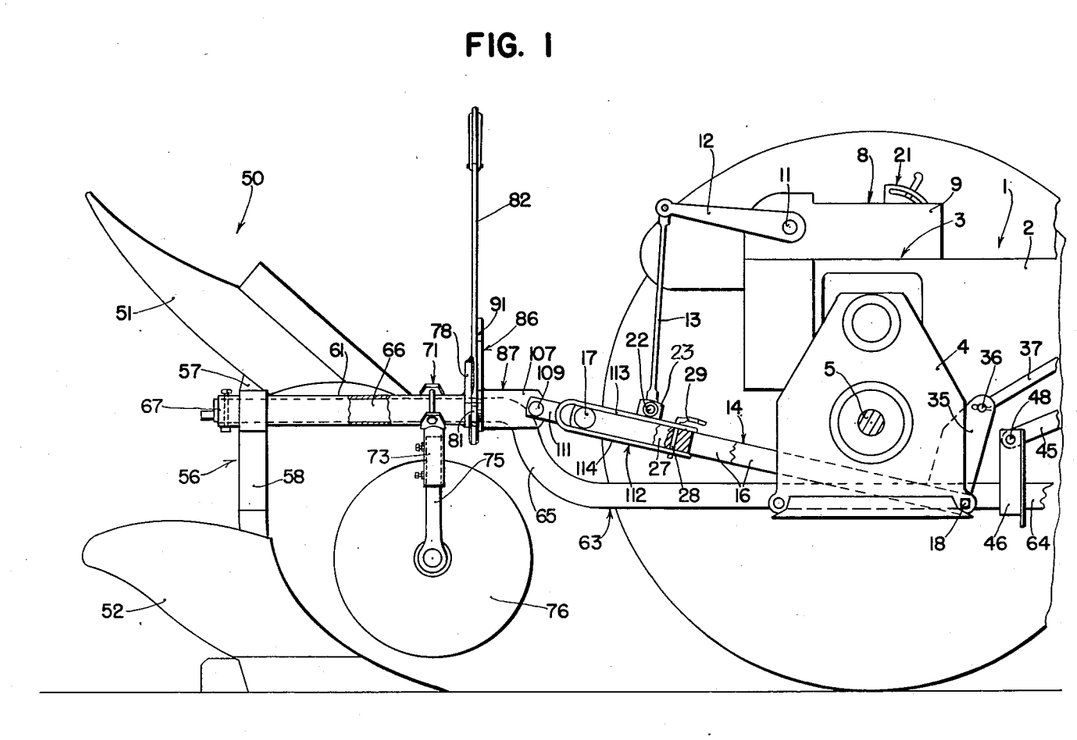
Figure 1 is a side view of the preferred form of tractor mounted two-way plow in which the principles of the present invention have been embodied.
Figure 2:
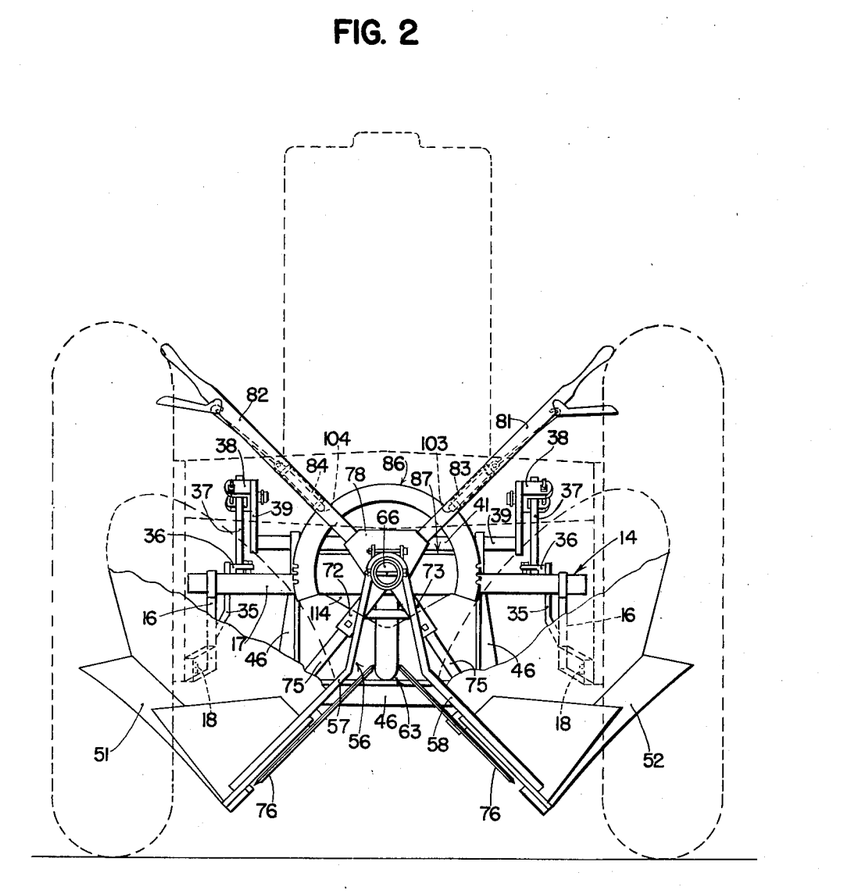
Figure 2 is a rear view of the plow shown in Figure 1, with the right and left hand plow bottoms arranged in transport position, the lower lift unit 8 and associated lifting linkage being omitted so as to show other parts more clearly.
Figure 3:
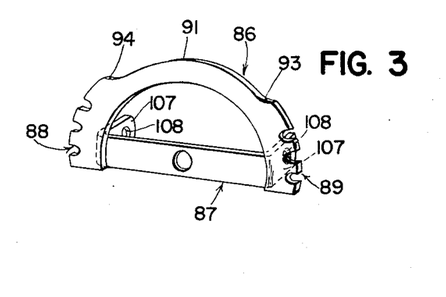
Figure 3 is a detail view showing the notched sector and its mounting on the hitch.

Referring now more particularly to the form of the invention shown in Figures 1-3, the reference numeral 1 indicates a farm tractor of more or less conventional construction, so far as the present invention is concerned, embodying a source of power mounted on frame means 2 at the rear of which is a rear axle structure 3 including a pair of drop housings 4 which enclose means for driving rear axle spindles 5. Also mounted on the rear of the tractor is a power lift unit 8, which includes a cylinder 9 in which a piston is moved in one direction by hydraulic power, the piston being connected to a rockshaft 11 which carries a pair of arms 12. The rear ends of the arms are connected by a pair of links 13 to a tractor drawbar or bail construction 14. The latter includes a pair of side bars 16 and a rear bar 17 welded to the ends of the side bars 16. The forward ends of the side bars are pivoted to the forward portions of the drop housings 4 by any suitable means, such as bolts 18. The power lift unit 8 is controlled by a valve structure 21 and acts through the links 13 to raise the tractor drawbar or bail 14 or to permit the latter to lower. The lower links 13 are pivoted to the side bars 16 by means of pins 22 which extend through apertures in the lower ends of the links 13 and through apertures in lugs 23 that are welded to the tractor drawbar. A draft bracket in the form of a generally triangular block 27 is welded to the central portion of the rear drawbar member 17, and extends forwardly and is apertured, as at 28, to receive a draft pin 29.

A pair of arms 35 are fixed to the forward portions of the bail side arms 16 and are apertured at their upper ends to receive swivel pins 36 which are adjustably fixed to the rear ends of links 37 that extend forwardly and upwardly at opposite sides of the tractor and are connected by swivel pins 38 to the upper ends of a pair of arms 39 (best shown in Figure 6) that are fixed to a cross shaft 41 that is supported in a pair of brackets 42 that are detachably connected with the tractor frame. A pair of rearwardly and downwardly extending arms 45 are fixed at their forward ends to the cross shaft 41 and carry a transverse bail member 46. Preferably, the rear ends of the arms 45 are apertured to receive a transverse rod 48 that extends across underneath the tractor, and the upper ends of the bail are apertured to receive the cross rod 48. Thus, whenever the power lift unit 8 is operated to raise or lower the tractor drawbar bail 14, the forward bail 46 is also raised and lowered a corresponding amount.

The two-way plow implement with which the present invention is more particularly concerned is indicated in Figures 1 and 2 by the reference numeral 50. The implement 50 includes a left hand plow bottom 51 and a right hand plow bottom 52 rigidly connected together by a generally V-shaped double plow bottom standard 56, one portion 57 of which supports the left hand plow bottom while the other portion 58 thereof supports the right hand plow bottom. The double standard 56 is secured, as by welding, to the rear end of a sleeve 61 that is rockably mounted on the rear end of a generally longitudinally extending beam or frame bar 63. The latter member includes a forward section 64 that at its forward end rests on the forward bail member 46, and the member 63 is bent upwardly, as at 65 (Figure 1), so as to provide a rear elevated section 66 on which the rockable sleeve 61 mentioned above is mounted. A collar 67 is fixed to the rear end of the frame bar 63 and serves to retain the sleeve 61 in position on the rear end of the frame bar 63.

At its forward end the sleeve 61 receives a double clamp member 71 having two socket sections 72 and 73, each of which is adapted to receive a shank 75 on the lower end of which a rolling colter 76 is mounted. Forward of the double support 71, a plate 78 is welded or otherwise secured to the front end of the sleeve 61 and a pair of hand levers 81 and 82 are fixed thereto. Each hand lever carries a suitable detent mechanism, as shown at 83 and 84, which operates along an arcuate sector 86 which is welded to a generally U-shaped draft bracket 87, best shown in Figure 3. The sector 86 is notched, having two sets of notches, as shown at 88 and 89, respectively, and a central section 91, which may be considered as an elongated notch, with shouldered portions 93 and 94 spaced apart and disposed adjacent the two sets of notches 88 and 89. The hand levers 81 and 82 are fixed to the plate 78 so as to be disposed approximately at right angles to one another, although this is not critical, and the shouldered portions 93 and 94 of the central section 91 of the sector 86 are spaced so that in the neutral position of the two plow bottoms, as shown in Figure 2, one detent plunger 103 is disposed against the shoulder 93 when the other detent plunger 104 is disposed against the shoulder 94. The forward portions 107 of the draft bracket 87 are apertured, as at 108, to receive attaching pins 109 (Figure 1) which extend through pairs of apertured lugs that are secured to a quick detachable saddle or hitch member 112. The latter member, best shown in Figure 1, is preferably formed of plate stock bent into generally U-shape, with upper and lower portions 113 and 114 generally triangular in shape and apertured at their forward portions to receive the attaching pin 29. Thus, merely by inserting or removing a single member, namely, the pin 29, the implement 50 may be connected to or disconnected from the tractor, it being understood that the forward end 64 of the member 63 slides in and out with respect to the forward bail 46 on the tractor when connecting and disconnecting the implement.

In operation, the implement may be lowered into operating position by opening the valve of the hydraulic unit 8 to permit the drawbar bail 14 to lower under the action of the weight of the tools connected therewith, as shown in Figure 1. The depth of plowing is controlled by raising or lowering the bail 14, and when it is desired to raise the tools out of their plowing position, as for transport, the power lift 8 is operated to raise the bail 14, and then the two plow bottoms 51 and 52 are swung into an intermediate position, as shown in Figure 2. In this position, the two hand levers 81 and 82 are disposed on opposite sides of the operator's seat 15 and the detent plungers 103 and 104 seat, respectively, against the shoulders 93 and 94 of the sector 86. Looking at Figure 2, it will be clear that if the operator should desire to plow with the left hand bottom 51, all that he needs do is to reach over and grasp the left hand lever 82, release the detent plunger 104 from the shoulder 94 and then push downwardly on the hand lever 82 to swing the plows into a position lowering the left hand unit 51 and raising the right hand unit 52. During this action it is not necessary for the operator to manipulate the hand lever 81, since in this left hand swinging of the plows, the detent plunger 103 on the lever 81 merely slides along the portion 91 of the sector 86, away from the shoulder 93, but it is not necessary to disengage the detent plunger 103 from the sector 86. Similarly, if the operator should desire to swing the right hand plow bottom 52 into operating or plowing position, all that he needs do is to grasp the right hand lever 81, disengage the detent plunger 103 from the shoulder 93, and then swing the hand lever 81 downwardly until the plunger is in a position to engage one of the notches 89. When swinging the left hand plow into position the operator permits the detent plunger 104 to engage one of the notches 88. The notch, 88 or 89, that is selected by the operator depends upon the depth at which he desires to plow. As will be understood, the tractor 1 is oscillated when plowing with one rear wheel in the previously opened furrow. This causes the tractor to operate in a tipped or tilted position, and the greater the depth of plowing the more the tilt of the tractor. Hence, when plowing deep, the hand lever detent of the down bottom is engaged with one of the uppermost notches, at one side or the other of the sector 86, while one of the lowermost notches is engaged when plowing at the more shallow depths. While we have shown only three notches at each side of the sector 86, it is to be understood that a greater number or a smaller number of notches may be employed. For example, a relatively small number of notches have proven satisfactory where detent mechanism of the double dog type, that is, a type having two detent plungers side by side, is used.

Figures 4, 5:
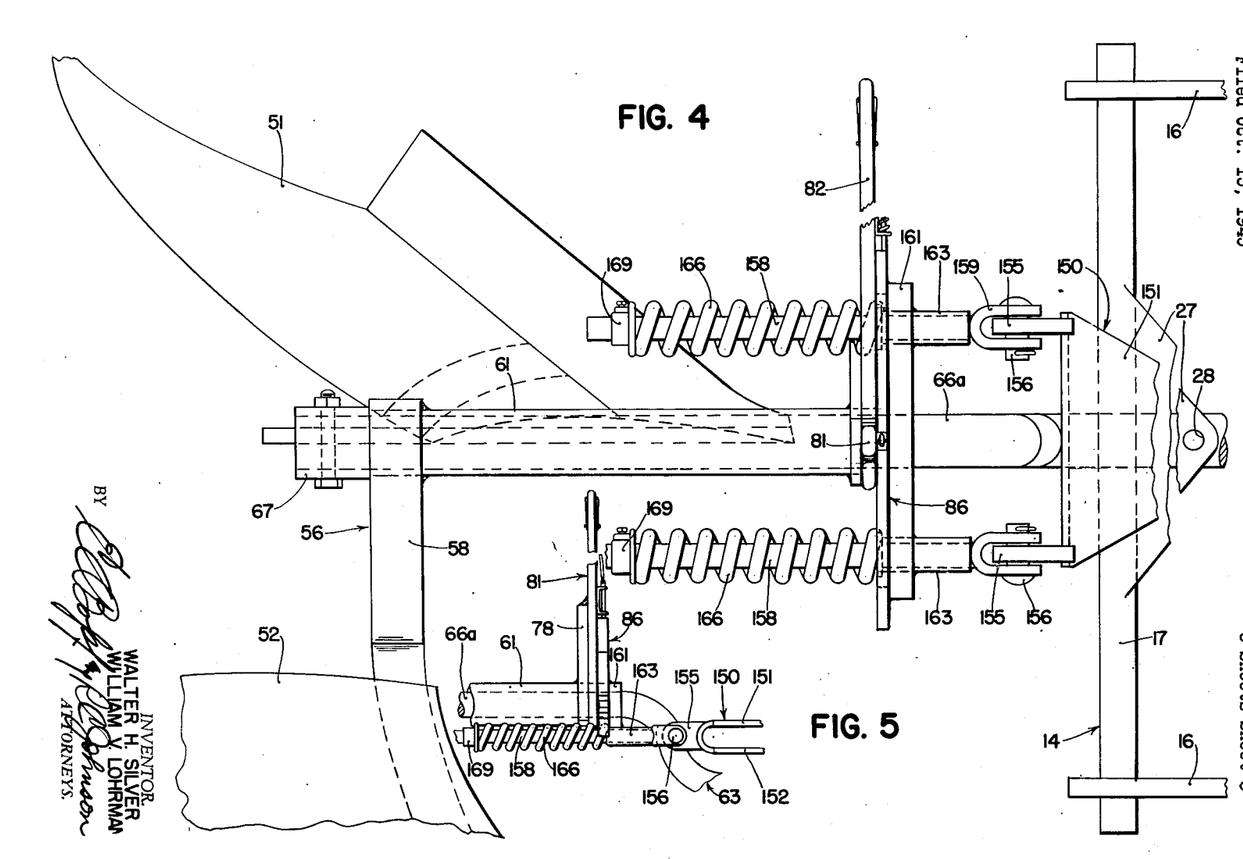

A modified form of the present invention is shown in Figure 4. This form of the invention is quite similar to that described above, and wherever the parts are identical with the invention as described above, the same reference numerals are used. Referring now to Figure 4, the frame bar 63 is, in this form of the invention, formed with an elongated rear section 66a, somewhat longer than the corresponding section shown in Figure 1. In this form of the invention, as in the form described above, the right and left hand plow bottoms 51 and 52 are secured to the sleeve 61 which is held on the frame bar section 66a by a collar 67. A pair of hand levers are fixed to the front end of the sleeve 61 in substantially the same manner as described above. However, in Figure 4 we have shown a spring cushion type of connection to the saddle member that is adapted to be connected by a pin to the tractor drawbar 14. The saddle member shown in Figure 4 is indicated by the reference numeral 150 and comprises upper and lower triangular sections 151 and 152 formed of plate stock and apertured to receive a pin, such as the pin 29 (Figure 1), which is adapted to connect the saddle 150 to the drawbar draft bracket 27. A pair of lugs 155 are fixed to the saddle 150 and are apertured to receive hitch pins 156. A pair of eyebolts 158 are provided with forward apertured and bifurcated ends 159 through which the pivot pins 156 extend. Each eyebolt 158 extends rearwardly through a generally rectangular connecting bar 161 to which forwardly extending short sleeves 163 are secured, as by welding. The rectangular plate 161 is apertured to receive the rear section 66a of the main frame bar, and in this form of the invention the sector 86 is welded to the bar 161. Springs 166 are disposed about the rear portions of the eyebolts 158, the latter carrying set screw collars 169 to receive the rear ends of the springs 166. The lever and detent mechanism in the form of the invention shown in Figure 4 is the same as described above. As best shown in Figure 5, the sleeves 163 through which the eyebolts 158 extend are welded to the lower edge of the rectangular draft bar 161. In this form of implement, the implement unit is readily detachable from and connectible to the tractor in the same way as described above, namely, by insertion and removal of the pin 29, after backing the tractor into a position bringing the drawbar member 17 into the saddle member 150, as shown in Figure 4.

Figure 6:
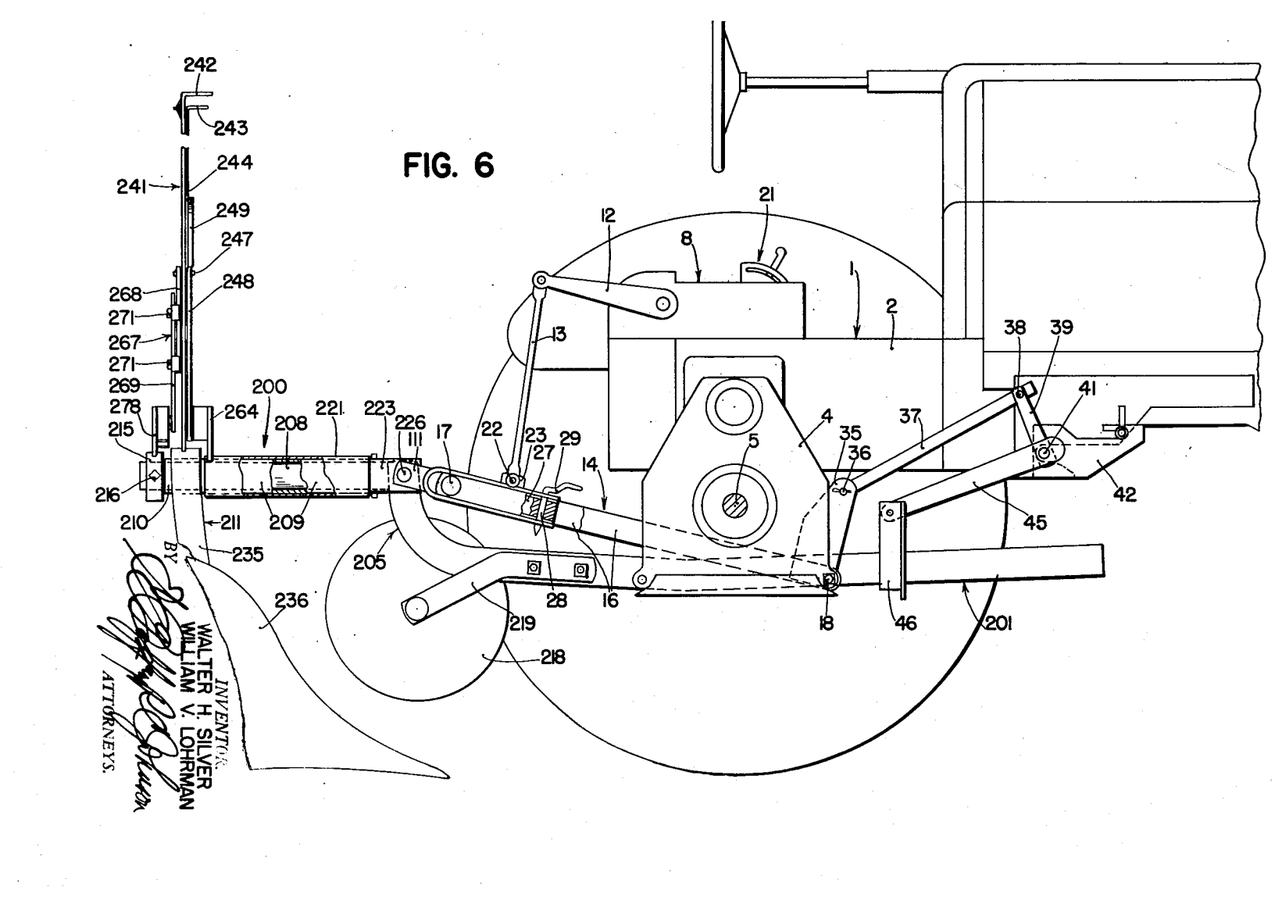
Figure 6 is a side view, similar to Figure 1, but showing a modified form of the present invention in which only a single colter is employed.
Figure 7:
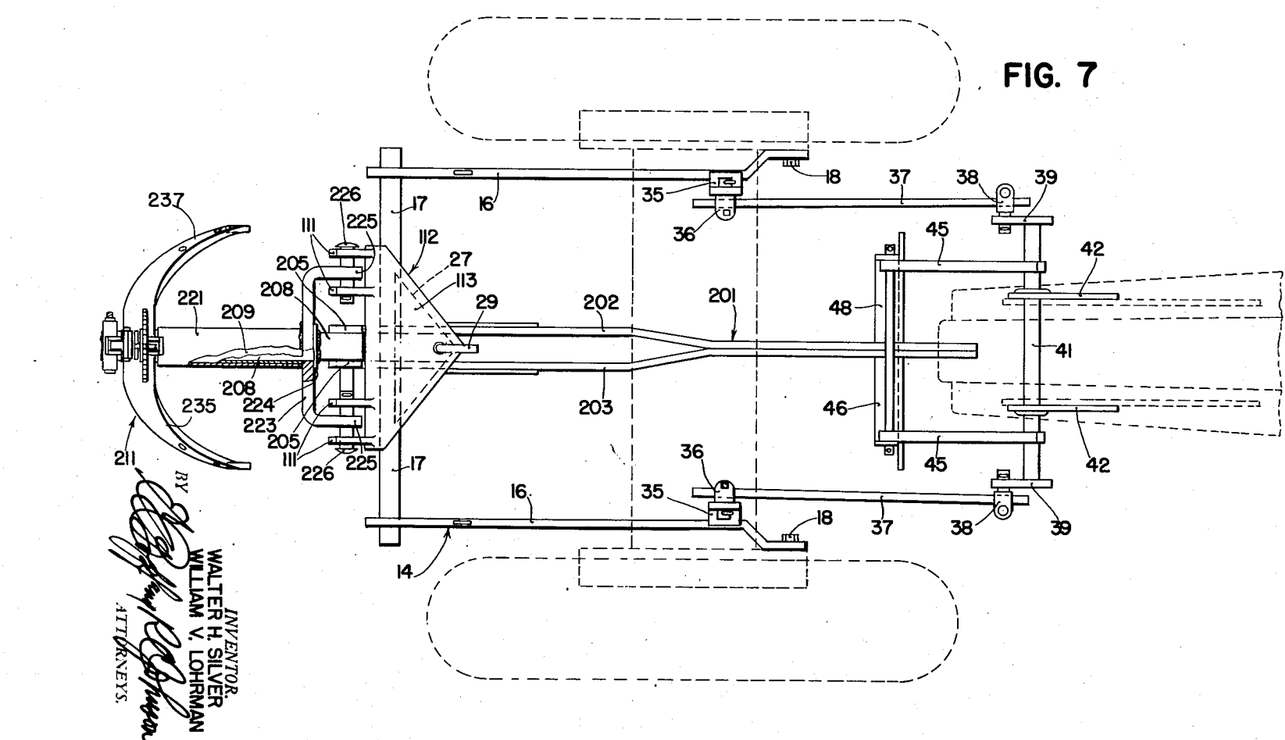
Figure 7 is a plan view of the form of the invention shown in Figure 6, the tractor being shown in outline so as to illustrate the implement in more detail.
Figures 8, 9:
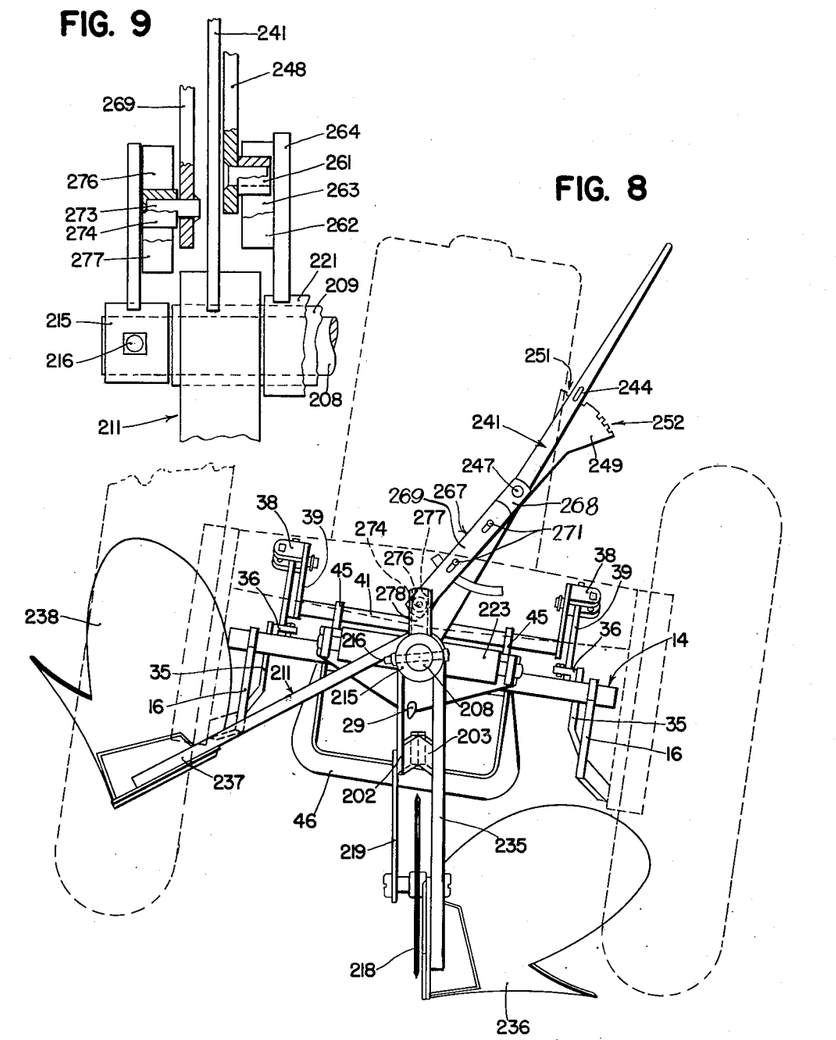
Figure 8 is a rear view, showing the right hand plow bottom in operating position, the power lift unit 8 and associated lifting linkage being omitted so as to show other parts more clearly.
Figure 9 is an enlarged detail view of a portion of the colter controlling means.

In Figures 6, 7 and 8 we have shown a modified form of the present invention which, while incorporating the principles illustrated in the previous figures and described in detail above, incorporates certain additional features, such as the use of a single rolling colter usable with either one of the right and left hand bottoms and automatically swinging into the proper position relative to the down bottom.

Referring now to Figures 6, 7 and 8, it will be seen that the tractor is the same as described above, as are also the drawbar construction and the forward depth adjusting bail construction and the interconnecting linkages therebetween. In this form of the invention the two-way plow unit is indicated in its entirety by the reference numeral 200 and incorporates a frame bar 201 preferably made up of a pair of longitudinally extending members 202 and 203 connected together at their front ends where they rest on the forward tractor depth adjusting bail 46 and spaced apart at their rear ends, as best shown in Figure 7, the rear end portions being bent rearwardly and upwardly, as at 205 (Figure 6), where the members 202 and 203 are secured, as by welding, to the forward end of a longitudinally extending bar 208, preferably formed of shafting or other round stock. Rockably mounted on the frame bar member 208 rearwardly of the frame bars 202 and 203 is an inner sleeve member 209 which at its rear end, as at 210, receives a V-shaped double plow bottom standard 211. Preferably, the standard 211 is secured by welding to the rear end 210 of the inner sleeve 209. A collar 215 is secured, as by a through bolt 216, to the rear end of the frame bar 208, and a rolling colter 218 is connected by a pair of brackets 219 to the frame bars 202 and 203 just forward of the rear upturned portions 205 thereof.

An outer sleeve 221 is disposed about the inner sleeve 209 and at its forward end is welded or otherwise secured to a yoke 223 which is apertured centrally to rockably receive the rear frame member 208. A collar 224 is disposed at the front side of the central portion of the yoke 223 and is welded to the frame member 208. The end portions 225 of the yoke 223 are apertured to receive pivot pins 226 which are carried by the lugs 111 on the saddle member 112, this member being of the same construction as the corresponding member 112 shown in Figure 1.

Thus, forward draft is transmitted from the tractor to the tractor bail 14 and thence to the implement 200 through the saddle member 112 to the yoke 223, and from the yoke 223 through the collar 224, the shaft section 208 and the rear collar 215 to the inner sleeve to which the double plow standard 211 is secured.

As will be seen from Figure 8, when a single colter is used, it is necessary to swing the colter a relatively small amount toward the right from the central plane of the tractor in order to bring the colter into the proper position with respect to the right hand plow bottom which is in operating position. Similarly, it is necessary to swing the colter substantially the same angular extent in the other direction, relative to the central longitudinal vertical plane of the tractor, when the other plow bottom is in plowing position. According to the principles of the present invention automatic means is provided for positioning the single colter in the proper position when the plow bottoms are reversed.

Referring first to Figure 6, the right hand branch 235 of the double plow bottom standard 211 carries a right hand plow bottom 236, and as shown in Figure 8 the left hand branch 237 of the double standard 211 carries a left hand plow bottom 238. The yoke 223, together with the sleeve 221 and associated parts, constitutes a draft-transmitting member by which forward pull is transmitted from the tractor to the plow standard 211 and the plows 236 carried thereby. The standard 211 is fixed to the inner sleeve 209, and fixed, as by welding, to the central portion of the standard 211 is a hand lever 241 which extends upwardly generally centrally of the implement unit and terminates in a handle 242 having a detent grip 243 controlling a detent of more or less conventional construction, indicated at 244. The hand lever 241 is apertured centrally to receive a through pin 247 which is secured rigidly, as by welding, to a vertically extending arm 248, the upper portion 249 of which is notched to serve as a sector for the detent 244, there being two sets of notches 251 and 252, as indicated in Figure 8. The lower portion of the arm 248 carries a stud on which a roller 261 is disposed. The roller operates between a pair of side members 262 and 263 which are welded in a generally vertical position to a vertical bar 264 that is fixed, as by welding, to the rear end of the outer sleeve 221. The two strips 262 form a vertical slot in which the roller 261 fits snugly and is movable vertically. On the rear side of the hand lever 241 a second arm 267 is disposed. The arm 267 comprises two relatively adjustable parts 268 and 269 normally held in different positions of adjustment, one relative to the other, by a pair of bolts 271. The lower end of the lower arm part 269 carries a stud 273 on which a roller 274 is mounted. The roller 274 is disposed between a pair of vertical members 276 and 277 that are secured, as by welding, to a vertical bar 278 that in turn is welded at its lower end to the collar 215 that is fixed to the rear end of the rear frame section 208. As best shown in Figure 9, the rear roller 274 is disposed at a greater radial distance from the pin 247. It is to be noted that the rear side members 276 and 277 form a vertical slot receiving the roller 274 similar to the construction mentioned above which provides a vertical slot for the forward roller 261. The bar 264 carrying the strips 262 and 263 is held against any lateral swinging movement about a generally longitudinal axis relative to the tractor by virtue of the fact that the sleeve 221 is welded to the hitch yoke 223.

The operation of this form of the invention is similar to that described above, and is practically identical therewith so far as raising and lowering the implement unit by raising and lowering the tractor drawbar or bail 14 and the forward bail 46. When, for example, it is desired to swing one of the plows into an operating position from a neutral position, somewhat similar to that illustrated in Figure 2, the operator grasps the hand lever 241 and swings the same in one direction or the other depending upon which plow bottom he desires to place in plowing position. Figure 8 shows the right hand plow bottom 236 swung into a plowing position, with the tractor operated in its normally tilted position in plowing, while the other plow bottom 238 is disposed in its non-plowing position. Since the hand lever 241 is connected directly to the double plow bottom standard 211, the swinging of one or the other of the plow bottoms 236 and 238 into and out of plowing position is a relatively simple operation. Since the forward arm 248, to which the rearward arm 267 is rigidly connected by the pin 247 and forms an integral linkage therewith, is connected through the vertical bar 264 with the sleeve 221 that is held against lateral swinging by its connection with the tractor drawbar, whenever the hand lever 241 is swung in a direction, as to the right into the position shown in Figure 8, a relative amount of clockwise rocking movement takes place between the hand lever 241 and the inter-connected arms 248 and 267, and since the sector 249 is an integral part of the forward arm 248, it will be seen that the hand lever 241 can be swung in one direction or the other only by first releasing the detent 244. After the plow bottom which it is desired to place in plowing position has actually reached plowing position, the detent hand grip 243 may be released so as to permit the detent to engage one of the notches of one or the other of the sets of notches 251 and 252. Remembering that the rear arm 267 is rigidly connected through the pin 247 with the arm 248, whenever the latter experiences a rocking movement, as in a clockwise direction as viewed in Figure 8, relative to the hand lever 241, the rear arm 278 is swung through a relatively greater angular displacement in the opposite direction, due to the fact that the roller 274 is slightly below the roller 261 and hence a farther distance from the axis of rocking movement, as defined by the pin 247. The arm 278 is connected rigidly to the collar 215, and since the latter is locked to the rear member 208 of the frame bar 201 by the bolt 216, it will be seen that whatever slight movement is imparted to the arm 278 by the above described movement of the hand lever 241 is likewise imparted to the frame member 201, and since the latter carries the colter 218, it will be seen that the latter will be swung into the proper position with respect to the plow bottom that is swung into an operating position. When the hand lever 241 is swung in the other direction to lower the other plow bottom, the colter 218 is likewise swung over in that direction into a position adjacent the landward edge of the plow bottom. By shifting the lower arm section 269 relative to the upper section 268, the position of the colter relative to the down plow bottom may be adjusted, as desired. It will be seen, further, that a single adjustment thus suffices for adjusting the position of the colter with respect to the down plow bottom, regardless of whether it is the right hand plow bottom or the left hand plow bottom that is swung into operating or plowing position. This particular construction is of importance in that it permits the use of a single colter and takes care of situations where there may not be sufficient clearance at the rear of the tractor to accommodate two colters, as in the form of the invention shown in Figure 2.

By comparing Figures 2 and 8, it will be noted that the right and left hand portions 235 and 237 of the double plow bottom standard 211 are straight while the right and left hand portions 58 and 57 of the double plow bottom standard 56 are offset. The advantage of the latter construction is that larger plow bottoms may be accommodated while permitting the use of relatively narrow tread tractors. In order to illustrate this arrangement, the tractors shown in Figures 2 and 8 are identical and have the same tread width. Reference to Figure 8 will show that the plow bottom 236 is appreciably smaller than the plow bottom 52 and that when the latter plow bottom is swung down into plowing position, corresponding to that shown in Figure 8, the offset portions mentioned above accommodate the larger plow bottoms. However, it is preferable to employ two separate colters where the offset plow bottom standard is used, this being the construction shown in Figure 2.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A two-way plow adapted to be connected to a tractor having an operator's station thereon, comprising a beam extending generally longitudinally, means connecting said beam with the rear portion of the tractor, a pair of right and left hand furrow opener units swingably mounted in fixed relation with respect to one another on said beam, a pair of hand levers arranged at an angle to one another and each fixed to said furrow opener units whereby movement of either hand lever will shift both of said units simultaneously so as to carry one into plowing position and the other out of plowing position, a common sector for both of said hand levers, each of the latter having detent means, and said sector having a pair of separated notched sections for cooperation with said detent means respectively.

2. The invention set forth in claim 1, further characterized by said separated notched sections on said sector being spaced apart so that when said units are in their neutral or intermediate position, the detent means on said two hand levers are disposed at the inner end of the associated notched sections whereby when either unit is swung by the associated hand lever into an operating position the detent means of the other lever moves along the intermediate space of said sector between said notched portions without interfering with the movement of said other lever relative to the sector and without unlatching the detent means of said other lever.

3. A two-way plow adapted to be mounted on a wheeled mobile support, one side of which normally operates in the previously formed furrow whereby said mobile support normally operates in a laterally tilted position, said two-way plow comprising right and left hand plowing means, means for swingably connecting said plowing means with said support for movement alternately into plowing positions, means including a lever for shifting said plowing means from one position to the other, a single colter disposed ahead of said plowing means and shiftably connected with said mobile support, and means including motion-reversing linkage connected between said lever and said colter for shifting said colter in one direction relative to said mobile support when the plowing means is shifted by said lever in the other direction so as to bring the colter into a substantially vertical position when the mobile support occupies its normally tilted position, when either of said plowing means is in operative plowing position.

4. A two-way plow adapted to be mounted on a tractor, comprising a generally longitudinally extending draft transmitting member, means for connecting said draft transmitting member to the tractor so as to tilt laterally therewith, right and left hand plowing means swingably connected with said member for movement about a generally longitudinal axis into and out of plowing positions, optionally, a part carried by and shiftable laterally relative to said draft transmitting member, a colter fixed to said part ahead of said plowing means, means acting between said draft transmitting member and said plowing means for swinging the latter optionally into plowing position, and means connected between said swinging means and said part for shifting the latter in a direction opposite to the direction of movement of said plowing means, whereby to bring said colter into proper position relative to the plowing means that is swung into plowing position.

5. A two-way plow adapted to be connected to a tractor having a drawbar, comprising a draft transmitting member detachably connected with said drawbar and including a generally longitudinally extending section, right and left hand plowing means swingably connected with said section for movement about a generally longitudinal axis, a generally longitudinally extending part shiftable relative to said section for movement about a generally longitudinal axis, a colter connected with said part, means connected with said plowing means for optionally swinging either the right or left hand plowing means into plowing position, and motion-reversing means connected with said last mentioned means to be actuated thereby and reacting against said draft transmitting member for simultaneously shifting said colter into operative position relative to the plowing means that is swung into plowing position.

6. A tractor mounted two-way plow comprising a generally longitudinally extending beam, a part swingably mounted thereon about a generally longitudinal axis, right and left hand furrow opener means carried thereby, a part on said beam connected with the tractor and held by the latter against movement about a generally longitudinal axis relative to the tractor, means for swinging said first part so as to shift one or the other of said furrow opener means into plowing position, a single colter swingable generally laterally relative to the tractor, means operative to swing said colter in one direction when the furrow opener means is swung in the other direction, and means acting between said first mentioned swinging means and said second part for locking both said furrow opener means and said colter in position.

7. In a tractor mounted two-way plow, a generally longitudinally extending beam, means for connecting said beam in draft transmitting relation with the tractor and including a first sleeve with respect to which said beam is swingable about a generally longitudinal axis and means for connecting said sleeve to the tractor, a second sleeve disposed within said first sleeve and about said beam, right and left hand furrow opening means connected with said second sleeve rearwardly of said first sleeve, means on the rear end of said beam for transmitting forward draft to said second sleeve, a colter disposed forward of said furrow opener means and fixed to swing laterally with said beam, a lever fixed to said furrow opening means for swinging the latter and said second sleeve in one direction or the other relative to said first sleeve for positioning one or the other of said furrow opening means in plowing position, a pair of slotted members, one mounted on said first sleeve and the other fixed to said beam, and a pair of interconnected arms having ends disposed, respectively, in the slots of said slotted members, said arms being of unequal length and pivotally mounted on said lever, whereby when the latter is actuated to swing said furrow opener means in one or the other direction, said interconnected arms are pivoted relative to the lever by virtue of said connection with the slotted member of said first sleeve and act through said other slotted member for swinging said beam and said colter so as to bring the latter into the proper position relative to the furrow opener means that is brought into plowing position.

8. A tractor mounted two-way plow comprising a generally longitudinally extending beam having a front section, an upwardly and rearwardly extending intermediate section and a generally rearwardly extending section, a sleeve mounted on said rearwardly extending section, right and left hand furrow openers carried rigidly on said sleeve, a transverse part connected with said beam adjacent the juncture of said intermediate and rearwardly extending sections, a hitch member adapted to be connected to said tractor and pivotally connected at its rearward portion to said transverse part for movement relative thereto about a transverse axis and disposed generally above said intermediate beam section, there being space above the latter to accommodate relative pivotal movement between said hitch member and said transverse part and beam about said axis, and means acting between said transverse part and said sleeve for controlling the position of the latter and said furrow openers relative to said beam.

9. A tractor mounted two-way plow comprising a generally longitudinally extending beam having a front section, an upwardly and rearwardly extending intermediate section and a generally rearwardly extending section, a sleeve mounted on said rearwardly extending section, right and left hand furrow openers carried rigidly on said sleeve, a transverse yoke connected with said beam adjacent the juncture of said intermediate and rearwardly extending sections and having a pair of laterally spaced forwardly extending lugs, a sector fixed to said yoke, a hitch member adapted to be connected with said tractor and having a pair of rearwardly extending parts pivotally connected, respectively, to said lugs so as to dispose said hitch member generally above said intermediate beam section, there being space above the latter to accommodate relative pivotal movement between said hitch member and said yoke and beam about the axis defined by the pivotal connection between said hitch member and said yoke, and lever means fixed to said sleeve adjacent said yoke and optionally connectible with said sector for controlling the position of said sleeve and furrow openers relative to said beam.

10. A tractor mounted two-way plow comprising a generally longitudinally extending beam having a front section, an upwardly and rearwardly extending intermediate section and a generally rearwardly extending section, a sleeve mounted on said rearwardly extending section, right and left hand furrow openers carried rigidly on said sleeve, colter means carried by said sleeve immediately in rear of said intermediate beam section and between the latter and said furrow openers, a hitch part adapted to be connected with the tractor so as to be held against rocking movement relative thereto, and means acting between said transverse part and said sleeve for controlling the position of the latter and said furrow openers relative to said beam.

11. A tractor mounted two-way plow comprising a generally longitudinally extending beam having a front section, an upwardly and rearwardly extending intermediate section and a generally rearwardly extending section, a sleeve mounted on said rearwardly extending section, right and left hand furrow openers carried rigidly on said sleeve, a transverse yoke connected with said beam adjacent the juncture of said intermediate and rearwardly extending section, a hitch member adapted to be connected to said tractor and pivotally connected at its rearward portion to said transverse yoke for movement relative thereto about a transverse axis and disposed generally above said intermediate beam section, there being space above the latter to accommodate relative pivotal movement between said hitch member and said yoke and beam about said axis, colter means carried by said sleeve immediately in rear of said intermediate beam section and between the latter and said furrow openers, and means acting between said transverse yoke and said sleeve for controlling the position of the latter and said furrow openers relative to said beam.

12. A tractor mounted two-way plow adapted to be connected with a tractor, comprising a hitch member adapted to be connected with the tractor to receive draft therefrom and to tilt laterally with the tractor, a plow-carrying part rockably connected in draft-receiving relation with said hitch member and swingable relative thereto about a generally longitudinally extending axis, a pair of plow bottoms carried by said plow-carrying part and connected in draft-receiving relation with said hitch member and swingable laterally relative thereto, a colter-carrying part also rockably connected with said hitch member and swingable laterally relative thereto, means for swinging said plow-carrying part relative to said hitch member, and motion-transmitting means connected with said plow bottom swinging means and acting against said hitch member and said colter-carrying part for shifting the latter when said plow bottoms are swung from one position to another.

13. A tractor mounted two-way plow adapted to be connected with a tractor, comprising a hitch member adapted to be connected with the tractor to receive draft therefrom and to tilt laterally with the tractor, a generally longitudinally extending beam member rockably connected in draft-receiving relation with said hitch member and swingable relative thereto about a generally longitudinally extending axis, a pair of plow bottoms connected in draft-receiving relation with said beam and swingable laterally relative thereto, a colter connected for lateral movement relative to said hitch member, means connecting the colter with said beam so as to be controlled by the latter, means for swinging said plow bottoms relative to said hitch member, and motion-transmitting means acting against said hitch member and said beam and operatively connected with said plow bottom shifting means to be actuated thereby for shifting said colter when said plow bottoms are swung from one position to another.

14. A tractor mounted two-way plow adapted to be connected with a tractor, comprising a hitch member adapted to be connected with the tractor to receive draft therefrom and to tilt laterally with the tractor, a generally longitudinally extending beam member rockably connected in draft-receiving relation with said hitch member and swingable relative thereto about a generally longitudinally extending axis, a pair of plow bottoms connected in draft-receiving relation with said beam and swingable laterally relative thereto, a colter rotatably mounted on said beam, means for swinging said plow bottoms relative to said beam, and motion-transmitting means connected with said plow bottom swinging means and acting against said hitch member and said beam for shifting said colter when said plow bottoms are swung from one position to another.

15. A tractor mounted two-way plow adapted to be connected with a tractor, comprising a hitch member adapted to be connected with the tractor to receive draft therefrom and to tilt laterally with the tractor, three concentrically disposed relatively rockable members, a pair of plow bottoms fixed to one of said members, a colter rotatably mounted on the second member, means for connecting the third member in draft-transmitting relation with said hitch member, means for transmitting draft from said hitch member to said one member, means for rocking said last-mentioned member relative to said hitch member, and motion-transmitting means operated by said rocking means and acting against said second and third members for shifting said colter when said plow bottoms are swung from one position to another.

16. A tractor mounted two-way plow adapted to be connected with a tractor, comprising a hitch member adapted to be connected with the tractor to receive draft therefrom and to tilt laterally with the tractor, a plow-carrying part rockably connected with said hitch member in draft-transmitting relation, a pair of plows fixed to said part, a second part connected with said hitch member for rocking movement relative thereto, an arm fixed to said first part for shifting said plows from one position to another, a lever pivoted to said arm and connected at one portion with said second part, and means connecting said lever at another portion with said hitch member, whereby movement of said arm to swing said plows serves to position said second part.

17. The invention set forth in claim 16, further characterized by a colter carried by said second part.

18. A tractor mounted two-way plow adapted to be connected with a tractor, comprising a hitch member adapted to be connected with the tractor to receive draft therefrom and to tilt laterally with the tractor, a plow-carrying part rockably connected with said hitch member in draft-transmitting relation, a pair of plows fixed to said part, a second part connected with said hitch member for rocking movement relative thereto, an arm fixed to said first part for shifting said plows from one position to another, a lever pivoted to said arm, a slotted member fixed to said second part, a second slotted member fixed to said hitch member, one portion of said lever being disposed in said first slotted member, and another portion of said lever being disposed in the second slotted member, whereby movement of said arm to swing said plows acts through said lever against said hitch member to position said second part.

19. In an agricultural implement adapted to be connected to a tractor, a hitch member adapted to be connected with the tractor to receive draft therefrom and to tilt laterally with the tractor, a pair of tool-carrying parts rockable relative to each other and relative to said hitch member, means for transmitting draft to both of said parts from said hitch member, an arm connected with one of said tool-carrying parts for swinging the same about its axis of rocking movement, and motion-transmitting means connected with said arm to be moved by the latter and reacting against said hitch member and acting against the other of said tool-carrying parts for shifting said other part.

20. The invention set forth in claim 19, further characterized by means for locking said motion-transmitting means to said arm, whereby both of said parts are held against movement relative to said hitch member.

21. The invention set forth in claim 19, further characterized by said motion-transmitting means comprising a lever pivoted at a mid-point on said arm and having end portions connected, respectively, with said other part and said hitch member, said lever having a sector movable relative to said arm, and detent means on said arm engageable with said sector for locking said lever to said arm, whereby both of said parts are held against movement relative to said hitch member.

22. A tractor mounted two-way plow comprising a generally longitudinally extending beam having a front section, an upwardly and rearwardly extending intermediate section and a generally rearwardly extending section, a sleeve mounted on said rearwardly extending section, right and left hand furrow openers carried rigidly on said sleeve, a transverse yoke connected with said beam adjacent the juncture of said intermediate and rearwardly extending sections and having a pair of laterally spaced forwardly extending lugs, a hitch member adapted to be connected with said tractor and having a pair of rearwardly extending parts pivotally connected, respectively, to said lugs so as to dispose said hitch member generally above said intermediate beam section, there being space above the latter to accommodate relative pivotal movement between said hitch member and said yoke and beam about the axis defined by the pivotal connection between said hitch member and said yoke, and lever means fixed to said sleeve and connected to act against said yoke for controlling the position of said sleeve and furrow openers.

23. A two-way plow as defined in claim 22, further characterized by a colter carried by said beam, and means acting between said lever means and said beam and responsive to movement of said lever means relative to said yoke for shifting said beam and colter relative to said furrow openers.

24. A two-way plow adapted to be connected to a tractor having an operator's station thereon, comprising a beam extending generally longitudinally, a transverse part adapted to be connected to the tractor so as to tilt laterally therewith, a pair of right- and left-hand furrow opener units swingably mounted in fixed relation with respect to one another on said beam, a pair of hand levers arranged at an angle to one another and each fixed to said furrow opener units whereby movement of either hand lever will shift both of said units simultaneously so as to carry one into plowing position and the other out of plowing position, a common sector for both of said hand levers, each of the latter having detent means, means fixing said sector to said transverse part, and said sector having a pair of separated notched areas for cooperation with said detent means, respectively.

25. A two-way plow adapted to be connected to a tractor having an operator's station thereon, comprising a beam extending generally longitudinally, means connecting said beam with the tractor so as to tilt laterally therewith, a pair of right- and left-hand furrow opener units swingably mounted in fixed relation with respect to one another on said beam, a pair of hand levers arranged at an angle to one another and each fixed to said furrow opener units whereby movement of either hand lever will shift both of said units simultaneously so as to carry one into plowing position and the other out of plowing position, a common sector for both of said hand levers, each of the latter having detent means, means connecting said sector with said beam so as to be held therewith against lateral movement relative thereto about a generally fore-and-aft extending axis, and said sector having a pair of separated notched areas for cooperation with said detent means, respectively.

26. A two-way plow adapted to be connected to a tractor having an operator's station thereon, comprising a beam extending generally longitudinally, a transverse part connected to said beam in draft-transmitting relation and having laterally spaced apart portions adapted to be connected with the tractor so as to tilt laterally therewith, a pair of right- and left-hand furrow opener units swingably mounted in fixed relation with respect to one another on said beam, a pair of hand levers arranged at an angle to one another and each fixed to said furrow opener units whereby movement of either hand lever will shift both of said units simultaneously so as to carry one into plowing position and the other out of plowing position, a common sector for both of said hand levers, each of the latter having detent means, means fixing said sector to said transverse part, and said sector having a pair of separated notched areas for cooperation with said detent means, respectively.

27. A two-way plow adapted to be connected to a tractor, comprising a generally longitudinally extending beam construction including a front section having rearwardly thereof an upturned portion, and a rear section, a pair of right- and left-hand furrow opener units swingably mounted in fixed relation with respect to one another on said rear beam section, a transverse member fixed to the forward portion of said rear beam section and including a pair of laterally spaced apart, generally forwardly extending apertured attaching portions, a hitch member adapted to be connected with the tractor so as to be rigidly held against movement relative to the tractor about a generally fore-and-aft extending axis, means for pivotally connecting said hitch member with said apertured portions for swinging movement about a generally transverse axis and so that said hitch member extends generally forwardly therefrom at the forward side of said upturned beam portion, means connected with said furrow opener units for swinging them from one side to the other relative to said rear beam section, and latching means acting between said furrow opener swinging means and said transverse member for holding said furrow openers against swinging relative to said hitch member.

WALTER H. SILVER.
WILLIAM V. LOHRMAN.

REFERENCES CITED

The following references are of record in the file of this patent:

UNITED STATES PATENTS

| Number | Name | Date |
|---|---|---|
| Re. 10,839 | Strait | May 31, 1887 |
| 219,219 | Chapman | Sept. 2, 1879 |
| 358,180 | Willson | Feb. 22, 1887 |
| 1,002,283 | Koch | Sept. 5, 1911 |
| 1,021,117 | Van Egeren | Mar. 26, 1912 |
| 1,076,001 | Butterfield | Oct. 14, 1913 |
| 1,358,158 | Karn | Nov. 9, 1920 |
| 1,793,002 | Neufang | Feb. 17, 1931 |
| 1,793,242 | Neufang | Feb. 17, 1931 |
| 1,807,731 | Ehricke | June 2, 1931 |
| 1,838,279 | Neufang | Dec. 29, 1931 |
| 1,902,845 | Graham et al. | Mar. 28, 1933 |
| 2,017,872 | Strandlund | Oct. 22, 1935 |
| 2,017,873 | Strandlund | Oct. 22, 1935 |
| 2,087,639 | Demeulenaere | July 20, 1937 |
| 2,364,367 | Janke | Dec. 5, 1944 |
| 2,401,837 | Mellen et al. | June 11, 1946 |
| 2,429,463 | Hurlimann | Oct. 21, 1947 |

FOREIGN PATENTS

| Number | Country | Date |
|---|---|---|
| 121,580 | Austria | Feb. 25, 1931 |
| 141,907 | Austria | June 11, 1935 |
| 18,364 | Germany | June 2, 1882 |
| 681,027 | Germany | Sept. 13, 1939 |
| 315,442 | Italy | Feb. 26, 1934 |
| 371,580 | Italy | May 29, 1939 |
| 182,630 | Switzerland | May 1, 1936 |